United States Patent [19]

Slavens et al.

[11] 4,260,869
[45] Apr. 7, 1981

[54] TRAVELING WELDING CARRIAGE

[75] Inventors: Clyde M. Slavens; Edward A. Clavin, both of Houston, Tex.

[73] Assignee: Midcon Pipeline Equipment Co., Houston, Tex.

[21] Appl. No.: 910,354

[22] Filed: May 30, 1978

[51] Int. Cl.³ .................. B23K 9/12; B23K 37/02
[52] U.S. Cl. .................. 219/124.31; 219/124.33; 219/125.11; 219/60 A; 228/29; 266/56; 104/119; 105/30; 105/33; 105/144
[58] Field of Search .......... 219/124.1, 124.02, 124.31, 219/124.33, 125.1, 125.11, 59.1, 60 A; 228/25, 29; 266/56; 74/106; 104/106, 107, 110, 118, 119; 105/30, 33, 144, 150, 155, 34 R

[56] References Cited

U.S. PATENT DOCUMENTS

| | | | |
|---|---|---|---|
| 1,852,413 | 4/1932 | Hickey | 266/56 |
| 1,869,013 | 7/1932 | Lincoln | 219/124.31 |
| 2,238,679 | 4/1941 | Cooper | 219/86.21 |
| 2,709,968 | 6/1955 | Cox | 105/30 X |
| 2,925,875 | 2/1960 | Bourdon | 105/144 X |
| 3,124,012 | 3/1964 | Hereth et al. | 74/106 X |
| 3,229,883 | 1/1966 | Yost | 219/125.1 X |
| 3,550,535 | 12/1970 | Rooklyn | 104/118 |
| 3,584,583 | 6/1971 | Cartwright | 105/30 X |
| 3,688,615 | 9/1972 | Protze et al. | 266/56 |
| 3,737,614 | 6/1973 | Paulange | 219/60 A |
| 3,844,468 | 10/1974 | Nelson et al. | 219/59.1 X |
| 3,942,449 | 3/1976 | Nelson | 104/107 |
| 4,092,928 | 6/1978 | Clavin | 104/119 |
| 4,093,080 | 6/1978 | Schwarzkopf | 105/4 R |
| 4,132,338 | 1/1979 | Bove et al. | 228/29 X |
| 4,161,640 | 7/1979 | Bromwich et al. | 219/125.11 |

Primary Examiner—B. A. Reynolds
Assistant Examiner—Keith E. George
Attorney, Agent, or Firm—Carl B. Fox, Jr.

[57] ABSTRACT

Traveling carriage apparatus, adapted to travel along a track disposed about or upon an object, to carry a device such as a welding torch to do work upon the object or upon other apparatus supported thereby. The apparatus is hinged end-to-end, preferably having three hinged-together portions, the angularity at the hinges being adjustable so that the apparatus may travel along a track which is either curved or flat. The apparatus is supported by track-engaging sets of wheels at its opposite ends. A retractable drive wheel assembly is carried by one of the hinged portions of the apparatus.

9 Claims, 14 Drawing Figures

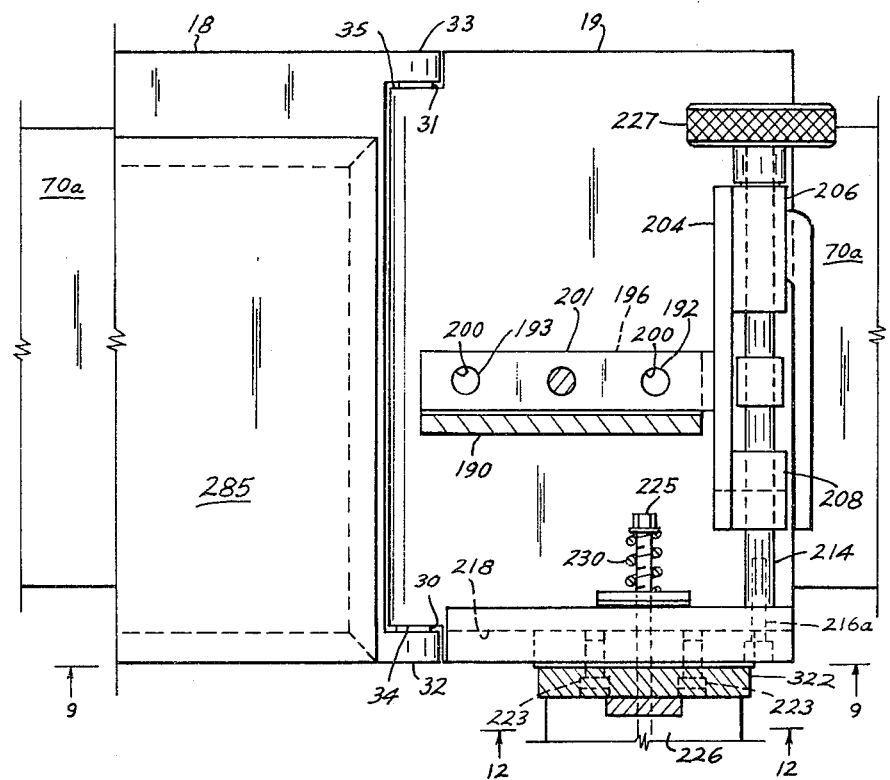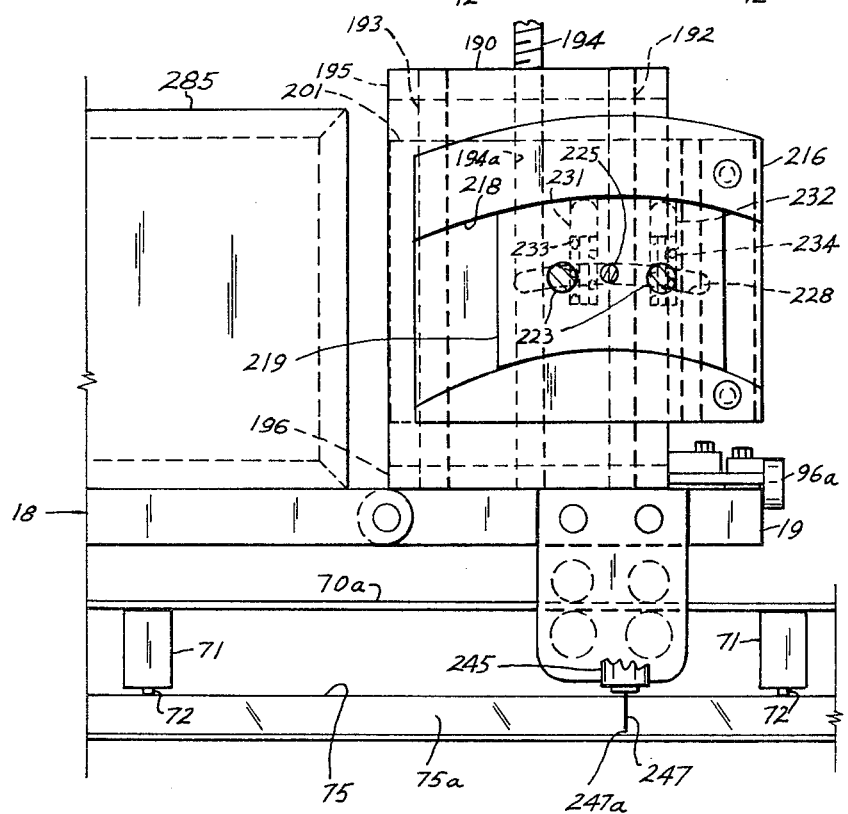

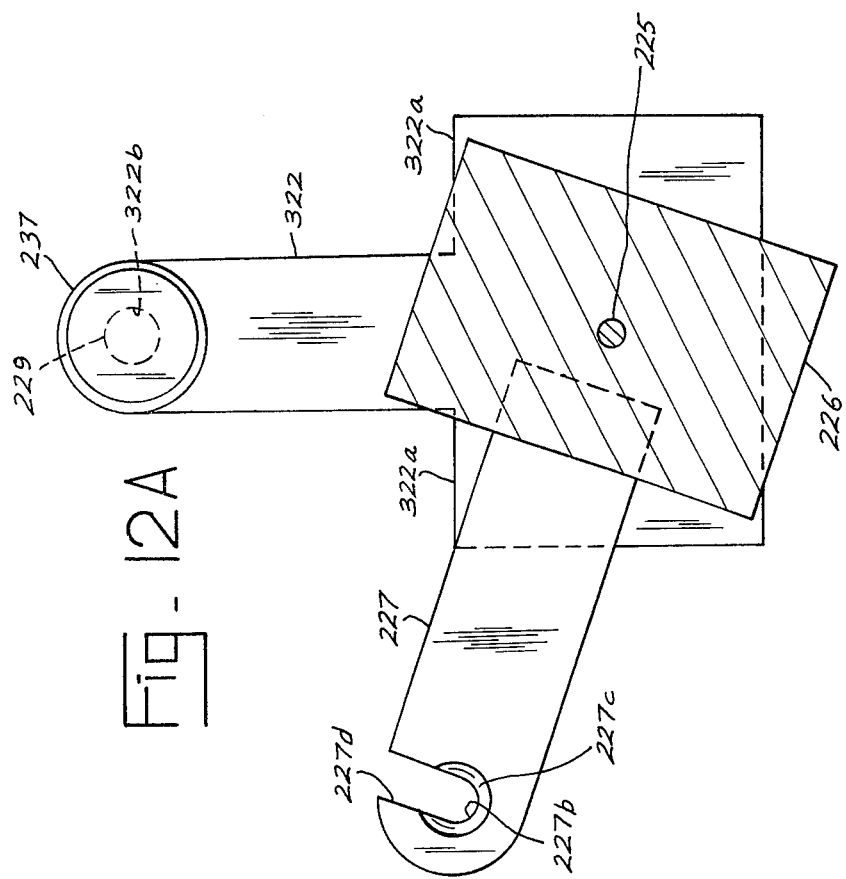
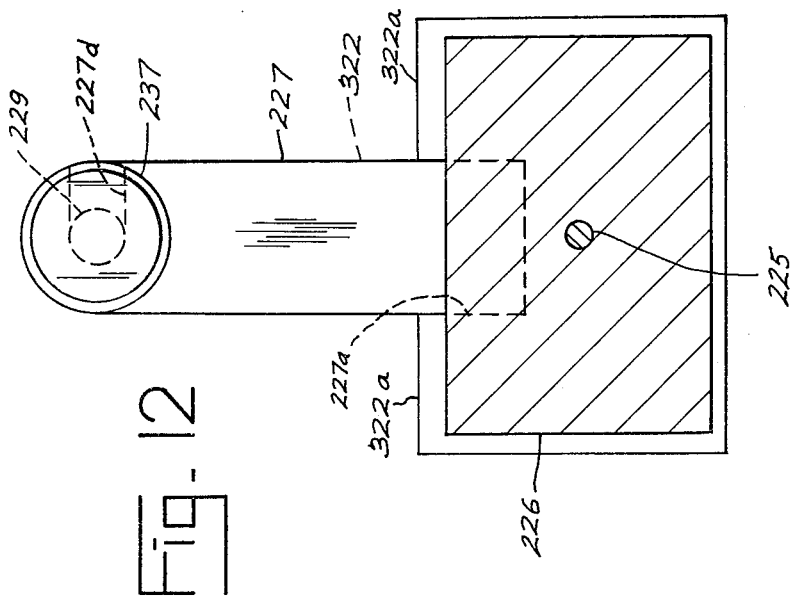

TRAVELING WELDING CARRIAGE

BACKGROUND OF THE INVENTION

In certain welding operations, it is necessary that the welding tip of the welding apparatus or welding tool be accurately moved along the line of the weld in order that a uniform weld may be achieved. Accuracy of travel of the welding tip is especially necessary in the case of girth welds employed to weld pipes together end-to-end. Similar considerations are important in doing other types of work on pipes or other objects. Pipelines of relatively large size designed to carry petroleum products therethrough must be welded together end-to-end by strong dependable welds because of the dangers inherent in the products which they carry. Uniformity of the welds is necessary in order that they will have adequate strength and dependability to prevent cracking and ruptures at the welds, and in addition, uniformity of the welds is necessary in order that penetrations of the welds at the pipe interiors will be controlled so as not to provide a hindrance to fluid flow through the pipelines. Similar requirements may also pertain to other equipment, such as tanks and processing equipment, especially those in which hazadous material is contained.

Where welding is done by hand, the welder may retrace his path to cure deficiencies in the welds as the welding proceeds. In the case of automatic welding, however, the welding must be done in continuous non-stop fashion and no retracing of the weld path or pass may be done. Therefore, in the case of automatic welding, it is extremely important that the welding tip accurately and uniformly follow the line of the weld in order that adequate strength and dependability of the weld may be obtained.

Welding or working carriages known in the art are shown in U.S. Pat. Nos. 3,229,883, 3,753,525, and 3,844,468. The carriages shown in these patents do not provide adequate stability of the welding apparatus travel to meet the requirements of automatic welding of pipelines for high pressure service, or for doing other comparable work upon a pipeline or other workpiece.

The instant invention seeks to provide a carriage for welding or other purposes of novel improved design.

SUMMARY OF THE INVENTION

According to the invention, a track supported carriage is provided which will adequately support a welding apparatus for travel along a welding groove or other weld path, and which may equally suitably be used to carry other tools or devices along paths along which work is to be done. According to the invention, the carriage preferably has a hinged support body formed in three support sections, wheel supports being provided for the end sections of the carriage. Means is provided for adjusting the angularities between the support sections in order that the apparatus may travel along either a convexly curved track or path or along a straight or flat track or path. The apparatus preferably travels upon a track which is supported spaced from the surface of the object upon which the work is to be done. The support wheels engage both surfaces or faces of the track, and additionally engage the track edges, so that full support of the carriage is achieved.

Means are provided whereby drive wheels which propel the carriage along the track remain firmly pressure-engaged with the track whereby no skipping or vibration of the wheels will occur during travel of the carriage along or about the track. Provision is made for adjustment of the position of the welding tool or torch, or other tool or device, with relation to the carriage, including adjustment of the angularity of the torch or tool, in a novel manner, whereby complete control of tool operation may be adequately achieved.

The apparatus herein presented is shown mounted for travel along a track of the type shown in application Ser. No. 910,353, fild concurrently herewith, the ends of which may be connected in the manner shown in said application Ser. No. 910,353. Any other suitable track apparatus which provides the required wheel engagement surfaces may be substituted for the track shown.

A principal object of the invention is to provide an improved carriage for travel along a track for accomplishing work upon an object along which the track is disposed. Another object of the invention is to provide such carriage apparatus which is extremely stable in travel. A further object of the invention is to provide such a carriage which may be adapted for supporting a welding torch or other work apparatus or device. Yet another object of the invention is to provide such carriage apparatus which has a hinged support body. A further object of the invention is to provide such carriage apparatus wherein the hinged support body may be adjusted as to angularities between the body portions. Another object of the invention is to provide such carriage apparatus which is economical, dependable, serviceable, and yet which is simple to operate.

Other objects and advantages of the invention will appear from the following detailed description of a preferred embodiment thereof, reference being made to the accompanying drawings.

BRIEF DESCRIPTIONS OF THE DRAWINGS

FIG. 4A is a partial vertical cross section taken at line 4A—4A of FIG. 4.

FIG. 8 is a plan view, partly in horizontal cross section, of the apparatus shown in FIG. 7.

FIG. 9 is a vertical cross section of the apparatus shown in FIG. 7, taken at line 9—9 of FIG. 8.

FIG. 12 is a partial vertical cross section taken at line 12—12 of FIG. 8.

FIG. 12A is similar to FIG. 12, showing a moved position of an element of FIG. 12.

DESCRIPTION OF THE PREFERRED EMBODIMENT

Figure 1:
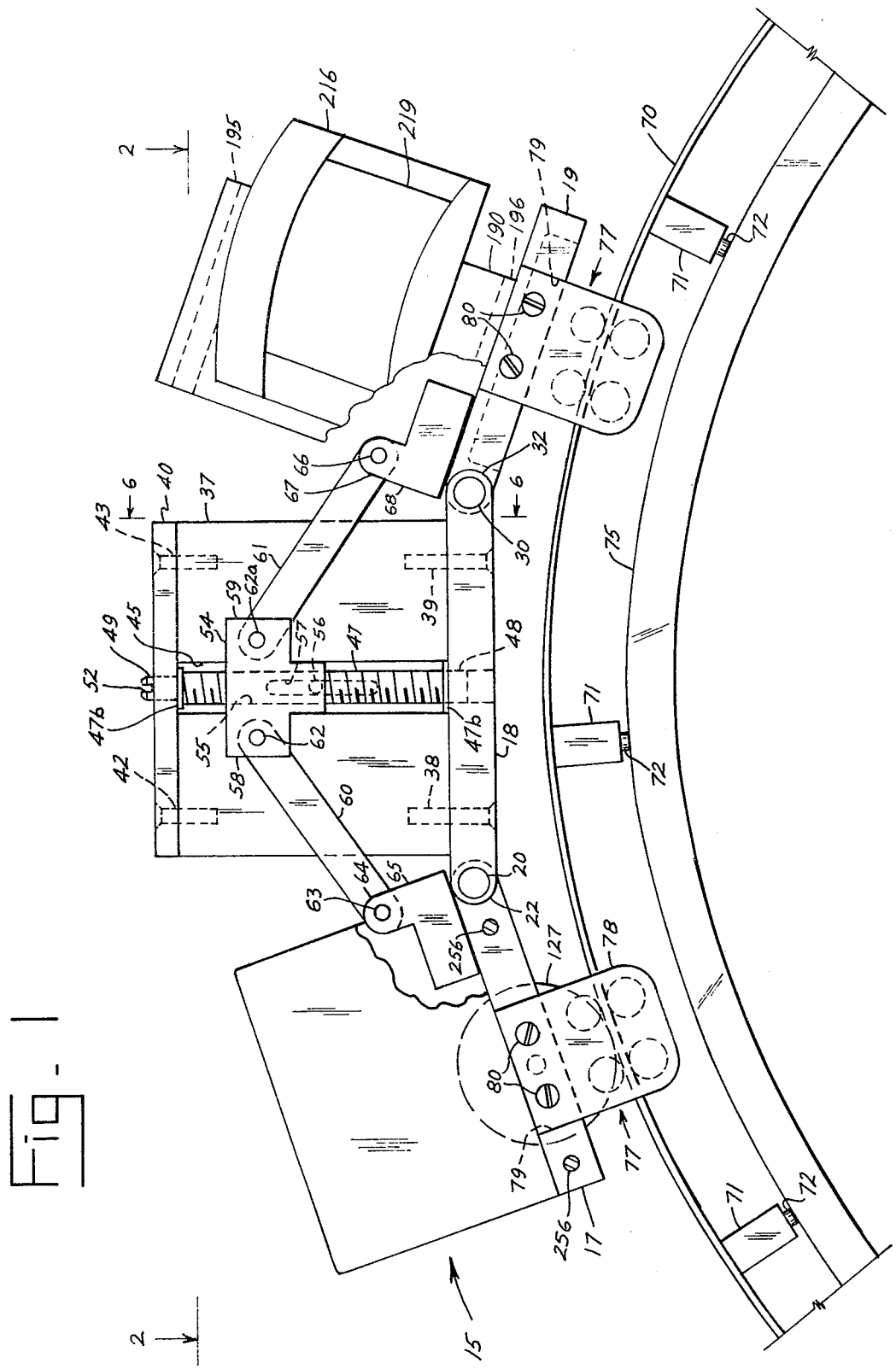
FIG. 1 is a side elevation showing portions of an apparatus in a preferred embodiment according to the invention.
Figure 2:
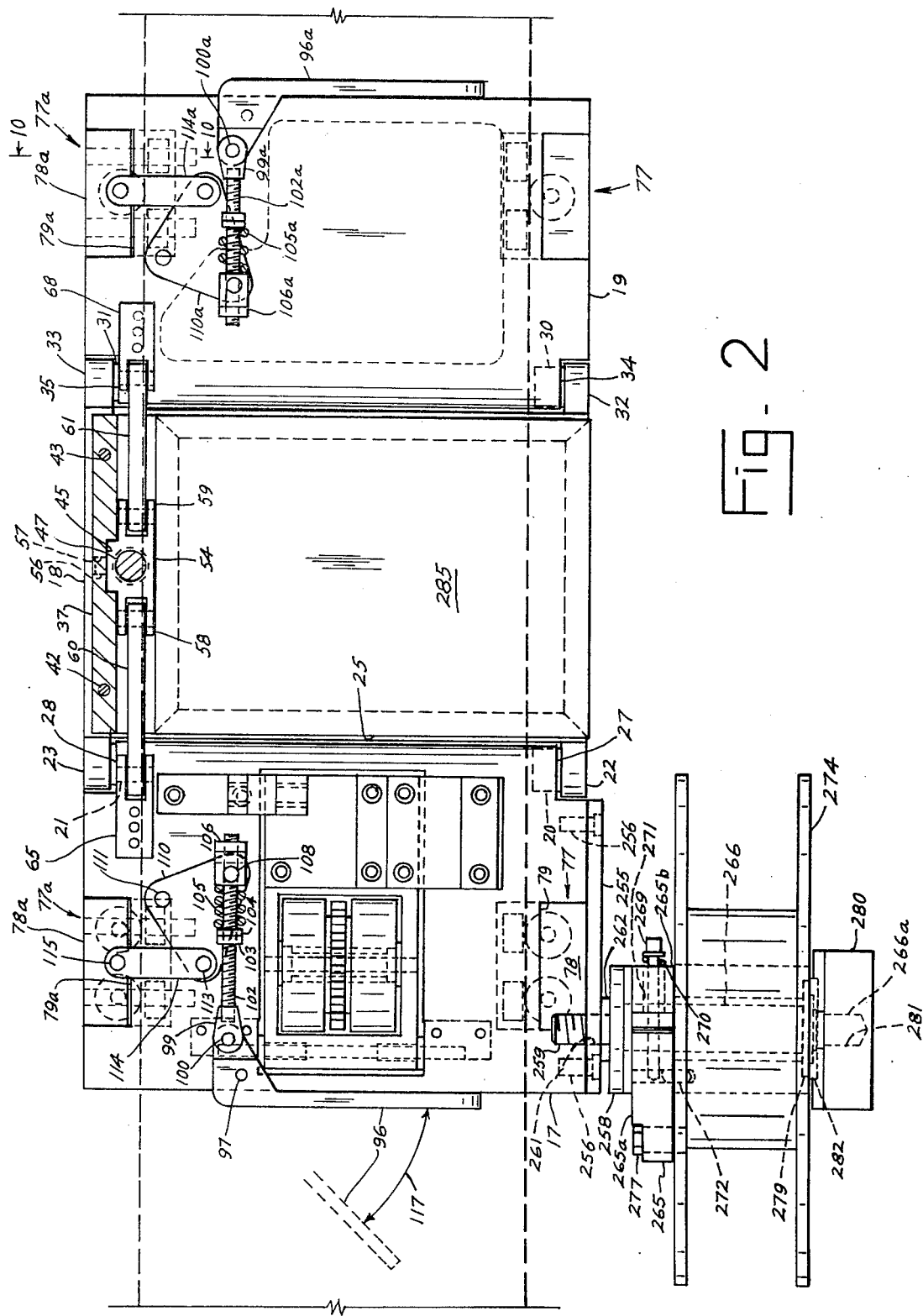
FIG. 2 is a plan view of portions of the apparatus shown in FIG. 1.

Referring now to the drawings in detail, and first to FIGS. 1 and 2, the carriage 15 has a support body formed by three hinge-connected support plates 17,18,19. Pins 20, 21 extend respectively through suitable openings through lugs 22, 23 formed at the ends of one side 25 of plate 18. The pins 20, 21 extend into suitable openings at opposite sides of plate 17 at corner recesses 27, 28, respectively. Plate 19 is similarly hinged to plate 18, and pins 30, 31 pass through suitable openings in lugs 32, 33 received in recesses 34, 35 of plate 19, respectively.

All of the elements carried by plates 17-19 are not shown in FIG. 1 in order that the assembly for adjusting the angles between plates 17-19 may be clearly shown. Throughout the drawings, elements are not shown in order that the elements described with a particular drawing may be more clearly shown, but all elements are shown in one or more of the drawings, and those skilled in the art will have no difficulty in understanding the complete structure of the apparatus.

Figure 6:
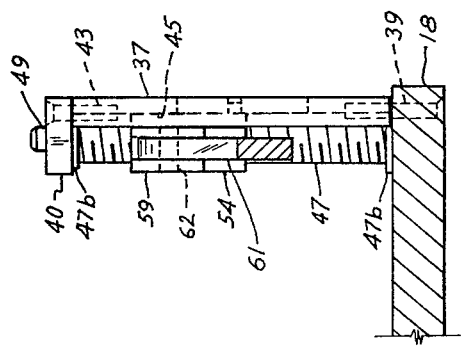
FIG. 6 is a partial vertical cross section showing a portion of the apparatus shown in FIGS. 1 and 2, taken at line 6—6 of FIG. 1.

An upstanding plate 37 is affixed to plate 18 by screws 38, 39 passed upwardly through plate 18 into plate 37 at its lower edge. A flange plate 40 is affixed along the upper edge of plate 37 by screws 42, 43, these elements being shown also in FIG. 6 of the drawings. Plate 37 has a vertical recess 45 of rectangular cross section at the center of its inner face. A threaded shaft 47 is rotatively secured to plate 18 at 48. The reduced upper end 49 of threaded shaft 47 is rotatively disposed through a cylindrical opening through flange plate 40. Washers 47b are disposed about the ends of shaft 47, as shown. Threaded shaft 47 may be rotated by engagement of a suitable tool in slot 52 across its upper end. When rotated, threaded shaft 47 does not move longitudinally.

A fitting 54 having a "T"-shaped configuration has a threaded opening 55 therethrough through which threaded shaft 47 is engaged. When shaft 47 is rotated in one rotative direction, fitting 54 is moved upwardly, and when shaft 47 is rotated in the opposite rotative direction, fitting 54 is moved downwardly. Pin 56 extends from the back of fitting 54 and is slidable in slot 57 in plate 37 to limit upward and downward movement of fitting 54. The opposite side portions 58, 59 of fitting 54 are slotted to form yokes withn which the upper ends of angular bars 60, 61 are respectively pivotally engaged at cross pins 62, 62a.

Figure 5:
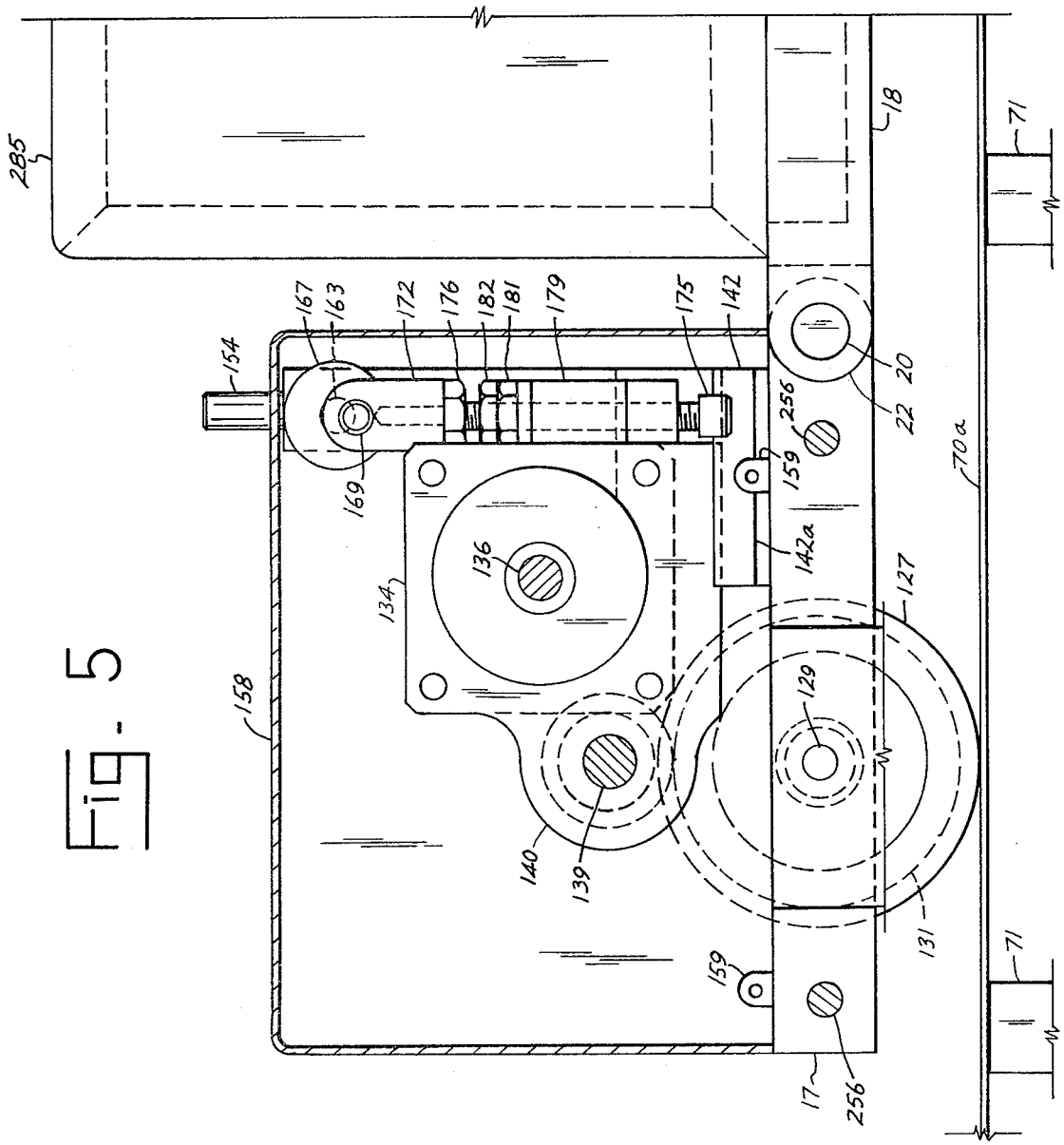
FIG. 5 is a side elevation, partly in vertical section, showing the apparatus shown in FIG. 4 of the drawings.

The lower end of bar 60 is pivotally affixed by cross pin 63 at yoke portion 64 of member 65 which is affixed to the upper surface of plate 17. The lower end of bar 61 is pivotally affixed by pin 66 in yoke portion 67 of member 68, the latter being secured to the upper surface of plate 19. When threaded shaft 47 is rotated in one direction to move fitting 54 upwardly, such movement of fitting 54 simultaneously draws plates 17 and 19 pivotally upwardly toward positions in line with plate 18, the in line positions being shown in FIGS. 5 and 9. Rotation of threaded shaft 47 in the opposite direction moves fitting 54 downwardly to make plates 17, 19 more angular with respect to plate 18, the angular positions being shown in FIG. 1. Because of this adjustment, the apparatus is capable of being utilized on either a curved track 70, as shown in FIG. 1 or on a straight or flat track 70a, as shown in FIGS. 5 and 9, plates 17-19 being rigidly fixed in relative positions in any of the straight or angular positions. The curvature of track 70 may be greater or smaller than that shown in FIG. 1 of the drawings, and the track may even be cruved at a very small radius for which plates 17 and 19 will be substantially perpendicular to plate 18. Any larger radius of curvature of the track up to the flat or straight form of track 70a may be used.

The tracks 70, 70a, are shown to be supported by crossbars 71 having pins 72 spacing each cross bar 71 from the surface of the object upon which the track is supported, and upon which work is to be performed.

Figure 7:
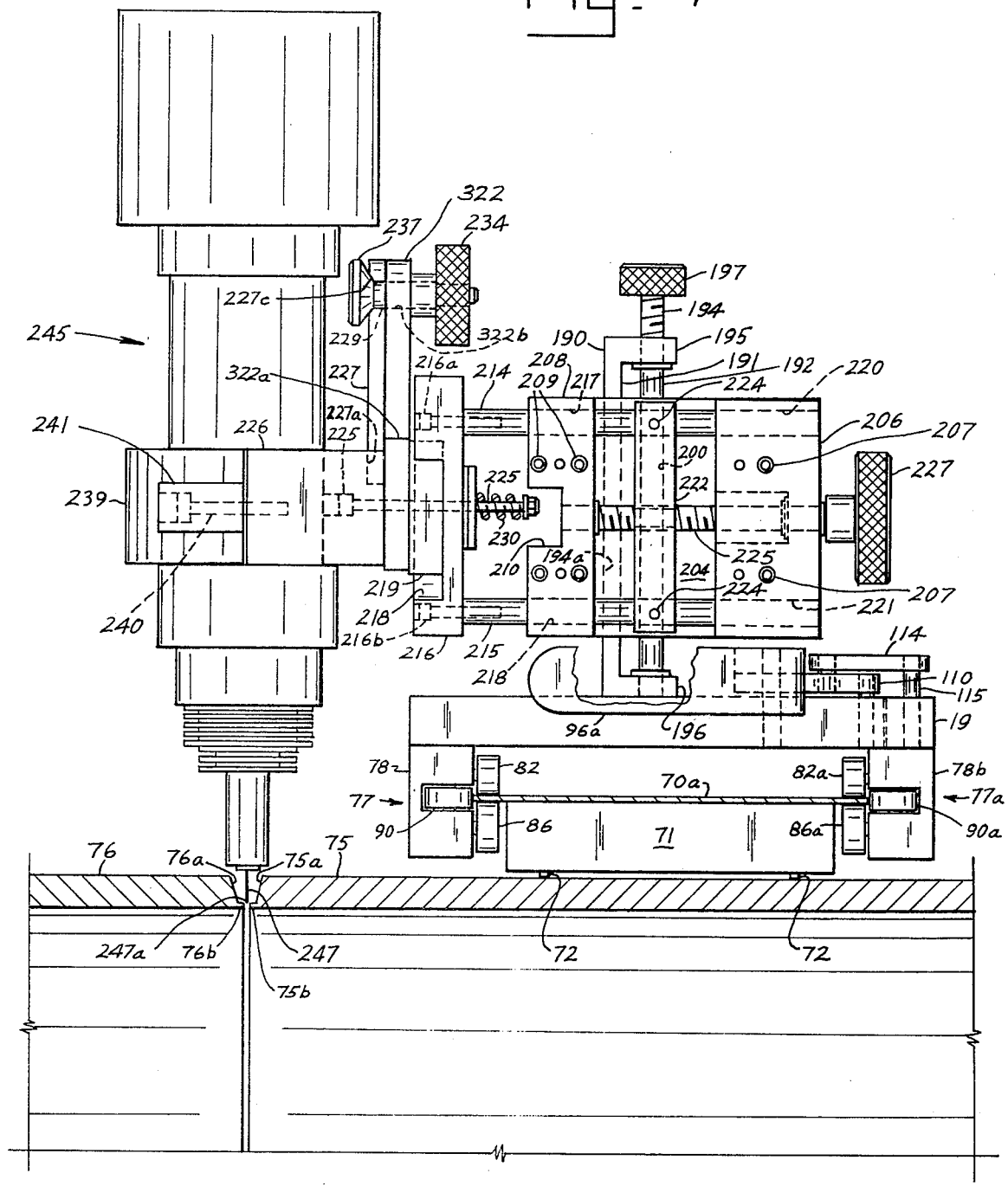
FIG. 7 is an end elevation showing a tool support provided by the invention.

Referring to FIGS. 1 and 7, the track 70 is shown supported about a pipe 75 in circular fashion. In FIGS. 5 and 9, wherein the track 70a is shown in straight or flat form, the apparatus is shown to be disposed along the longitudinal side of the pipe 75. In FIG. 7, pipe 75 is shown closely aligned with a second pipe 76 to which pipe 75 is to be welded end-to-end, the pipe ends being angularly formed at 75a, 76a, and provided with inner lips 75b, 75b to form a welding groove therebetween.

Figure 4:
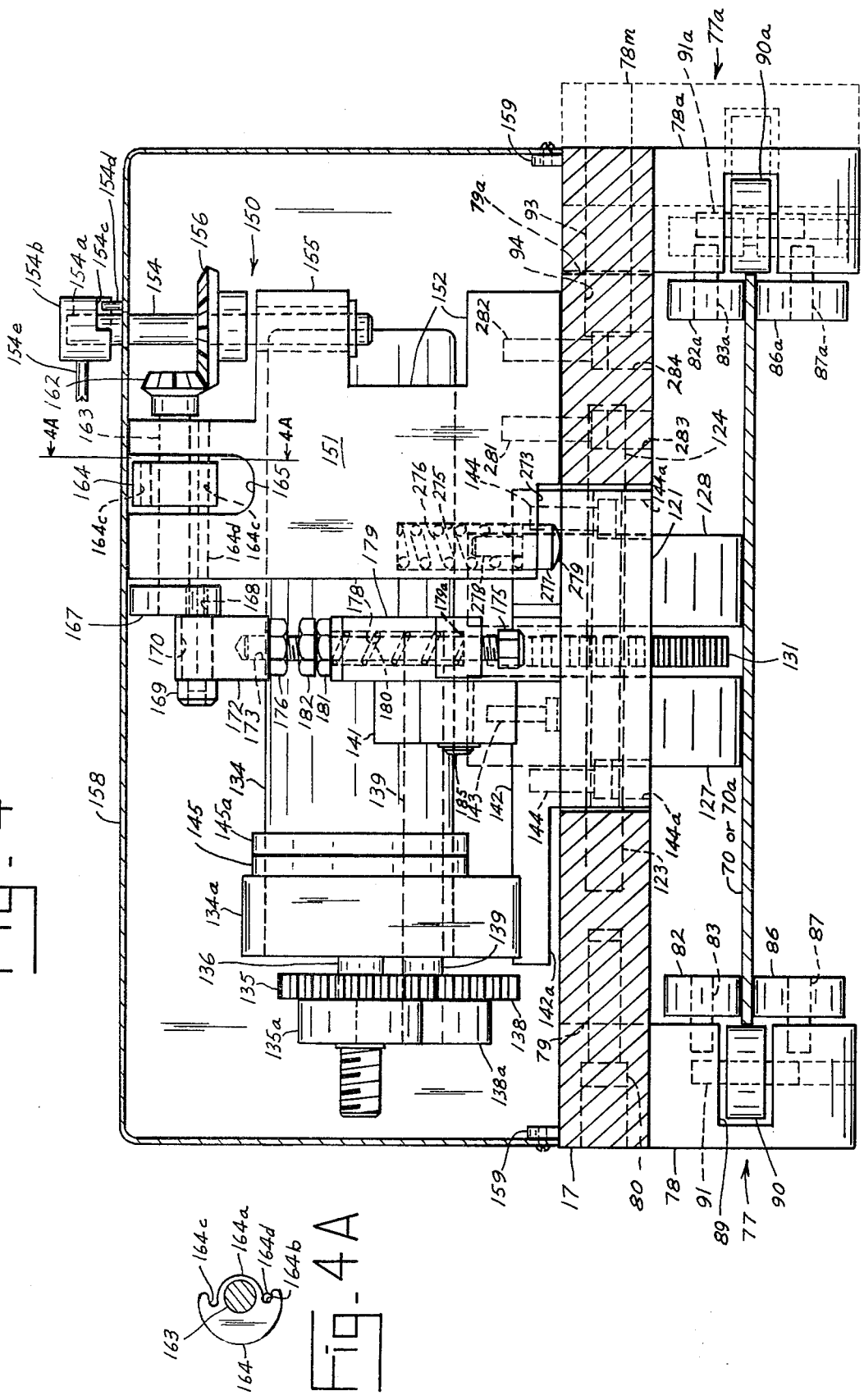
FIG. 4 is a vertical cross section taken at line 4—4 of FIG. 3.

Referring now especially to FIGS. 1, 2 and 4 of the drawings, plates 17 and 19 are each supported upon a track 70 or 70a by oppositely disposed assemblies 77 and 77a. Each assembly 77 includes a member 78, the upper end portion of which is fixed within a recess 79 in the side of the plate 17 or 19 by screws 80. Each member 78 extends below the plate 17 or 19 to which it is affixed, and has a wheel 82 rotatively mounted on a shaft 83 carried by the member 78. Each member 78 also carries a wheel 86 rotatively supported by a shaft 87 carried by the member 78. Each member 78 has a recess 89 within which a wheel 90 is rotatively carried by a cross shaft 91. As is best shown in FIG. 4 of the drawings, wheels 82, 86 engage opposite faces of the track 70 or 70a, and the wheel 90 engages the edge of the track. The two assemblies 77 are at the same side of the track, one carried by plate 17 and the other carried by plate 19. One or two wheels 90 may be provided.

At the opposite side of the track, assemblies 77a are disposed, these being carried by the plates 17 and 19 opposite the assemblies 77 thereof. Each assembly 77a includes a member 78a, corresponding generally to member 78, these carrying wheels 82a, 86a, and 90a, respectively, supported by shafts 83a, 87a, and 91a, corresponding to the elements of assemblies 77. The difference between each assembly 77a and each assembly 77 is that, instead of being screwed to the plates 17 and 19 by screws 80, the members 78a are slidably disposed on shafts 93 which are affixed into cylindrical shaft openings 94 of the plates 17 and 19. Members 78a are thereby movable in the recesses 79a in which they and may be moved outwardly and inwardly horizontally with respect to the plates 17 and 19.

Members 78a are moved horizontally inwardly and outwardly in the recesses 79a by assemblies which are best shown in FIG. 2 of the drawings. Looking first to the upper lefthand portion of FIG. 2, a crank 96 is pivotally connected to plate 17 at pivot pin 97. The fitting 99 which is pivotally connected to crank 96 at pin 100 has a threaded shaft 102 screwed into its inner end. Shaft 102 has a pair of nuts 103, 104 screwed thereon jammed one against the other to form a stationary but adjustable stop along the length of the shaft. A compression spring 105 bears against nut 104 and against fitting 106 through which shaft 102 is slidably engaged for limited sliding movement therethrough. Fitting 106 is pivotally connected at pin 108 carried thereby to generally triangularly shaped element 110, adjacent one corner thereof. Element 110 is connected pivotally at pin 111 to plate 17. At pin 113, element 110 is connected pivotally to a bar 114 the other end of which is connected at pin 115 to the adjacent member 78a. When crank 96 is moved outwardly, pivotally about pin 97, as indicated by arrow 117, threaded shaft 102 draws element 106 and pin 108 toward the lefthand end of plate 17, thereby rotating element 110 in a clockwise direction to move bar 114 outwardly. Member 78a thereby is moved outwardly to the position 78m, shown in FIG. 4 of the drawings. Return of crank 96 to against the side of plate 17 reverses the movements of shaft 102, element 110, and bar 114 to draw member 78a fully back into recess 79a. Since pin 97 is to one side of the longitudinal axis of shaft 102, compression spring 105 serves to maintain crank 96 against the side of plate 17, and thereby to maintain member 78a in its inward position.

At the other end of the apparatus, at the upper righthand portion of FIG. 2 of the drawings, there is shown a similar apparatus which is identical with that just described, except that shaft 102a is shorter than shaft 102, and the elements are shown in a mirror image configuration. The elements of this assembly are indicated by the same reference numerals already presented, except that each reference numeral has the suffix "a."

Referring now also to FIG. 4, it will be seen that the wheels 82a, 86a, 90a are moved away from the righthand edge of track 70 or 70a when member 78a is moved outwardly to its position 78m. This enables the apparatus to be connected to or removed from the track 70 or 70a. The outward movement of member 78a to position 78m is sufficient that the wheels 82a, 86a clear the edge of the track by a distance such that wheels 82, 86 may be installed on or removed from the opposite side of the track. Member 78a is moved inwardly from its position 78m to engage wheels 82a, 86a with the opposite sides of the track. Therefore, the apparatus may be installed on the track or removed therefrom in a very simple manner and in a very short time. The bars 71 which support the track, best shown in FIG. 7 of the drawings, terminate at each end in positions such that interference with the carriage wheels does not occur.

Figure 3:
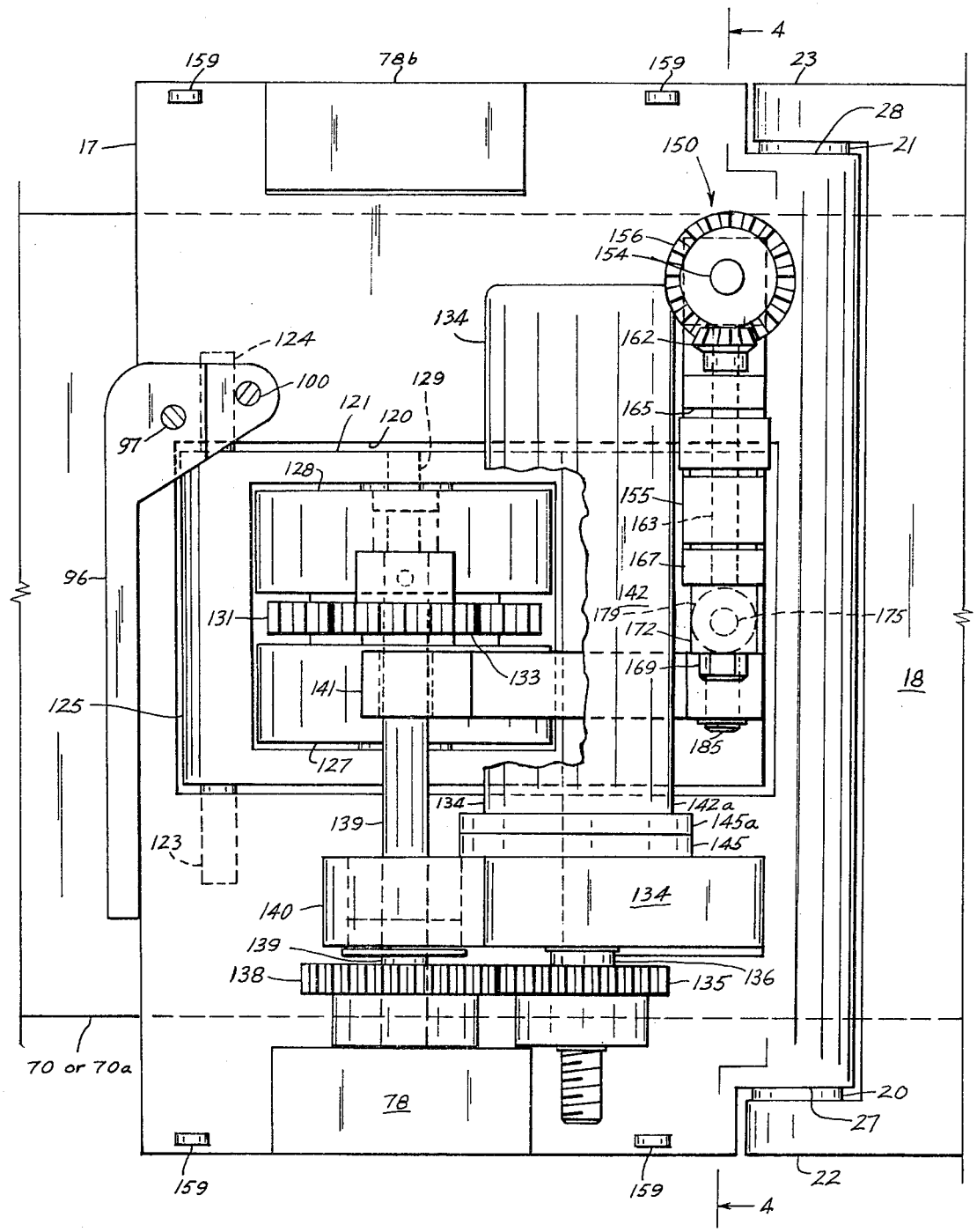
FIG. 3 is an enlarged plan view showing details of one end of the apparatus shown in FIGS. 1 and 2.

Referring now primarily to FIGS. 3–5 of the drawings, the assembly which drives the apparatus along the track will be described. Again, certain elements of the apparatus are omitted from these drawings in order not to confuse the description to now be presented. A hole or well 120 is provided through plate 17, being of rectangular shape. A pivotally movable plate 121 is disposed in opening 120, clearance being provided therearound in the opening. Plate 121 is pivotally connected to plate 17 at pins 123, 124, and the lefthand end of 125 of plate 121 is rounded to provide clearance for pivoting of plate 121. A single continuous pin extending completely through plate 121 may be used instead of the two pins 123, 124. Drive wheels 127, 128 are mounted on a support shaft 129 for rotation thereabout, and a gear 131 is engaged on shaft 129 spaced between the two wheels, as shown. A gear 133 carried on shaft 139 engages gear 131.

An electrically energized gearmotor 134 is supported on plate 142 by support 134a and has gear 135 fixed on its shaft 136. Gear 135 drives gear 138 fixed on shaft 139. Gear retainers 135a, 138a retain gears 135, 138, respectively, on shafts 136 and 139. Shaft 139 is supported in bearings (not shown) in portion 140 of the housing of motor 134, and by member 141 which is affixed to plate 142 by screws 143. Plate 142 is fixed transversely across plate 121 by a plurality of screws 144, the heads of the screws being disposed in counteropenings 144a at the lower side of plate 121. The downwardly relieved side portion 142a of plate 142 overhangs plate 17 at one side of well 120 and prevents the plate 121 from dropping more than a short distance beneath plate 17.

Gearmotor 134 has intermediate connection flanges 145, 145a connected by screws (not shown) whereby the gearmotor may be disassembled in customary manner.

As is best shown in FIGS. 4 and 5, wheels 127, 128 are engaged against the track 70 or 70a, which has already been described, for driving the carriage along the track. The track 70 or 70a may have a frictional surface element or coating, which is clearly described in application Ser. No. 910,353, previously referred to. The frictional coating or layer is not shown in the drawings in this application, but may be present. The wheels 127, 128 are preferably formed of polyurethane, which has great wear resistance and long operating life. However, the wheels may be formed of rubber or any other suitable material. Even though some wear of the wheels may occur, the apparatus is adapted whereby even considerable wear of the wheels will not adversely affect the operation of the apparatus.

The wheel material has a high coefficient of friction with respect to the track surface material, and slippage of the wheels does not occur to any significant extent. The wheels afford a positive drive upon the track, whereby the apparatus moves smoothly and uninterruptedly along the track so that welding or other work operations accomplished from the apparatus are not diminished in quality by any such slippage.

Since the wheels 82, 82a, 86, 86a are not forceably engaged against the opposite sides of the track, a certain amount of movement of the apparatus with respect to the track while the apparatus is traveling along the track during welding would occur except for the stabilizing effect of the pressure of the drive wheels 127, 128 against the upper surface of the track. The drive wheels and wheels 86, 86a forcefully engage the track therebetween, so that body or plate 17 is rigidly fixed in place with respect to the track, body or plate 19 likewise being fixed in place with respect to the track because of its rigid connection to body or plate 17. Therefore, no movement or vibration of the welding tool occurs during welding.

The wheels are moved into and out of engagement of the track by an assembly 150 which raises or lowers plate 142 and plate 121 connected thereto. Support body 151 affixed to plate 17 at one side of well 120, at the opposite end thereof from pivotal mountings 123, 124 of plate 121, has an irregular outline which is best shown in FIG. 4 of the drawings. Above a recess or slot 152 of plate 151 a rotatable shaft 154 is mounted through portion 155 of plate 151. Shaft 154 has a bevel gear 156 affixed therearound spaced from its upper end. The upper end of shaft 154, indicated by reference numeral 154a, extends through housing cover 158 which is removably connected to cover the upper side of plate 17 at lugs 159. A knob 154b is affixed to the upper end of upper end portion 154a of shaft 154. Knob 154b is relieved at 154c at a pie-shaped portion of its underside, and a pin 154d affixed to cover 158 extends into the relief. Pin 154d limits rotation of knob 154b and shaft 154 to about 93° rotation, or slightly more than 90°.

Knob 154b has a radially extending handle bar 154e, for use in rotation of the knob.

Gear 156 is rotated by rotation of shaft portion 154a by hand. Shaft portion 154a may alternatively be adapted for rotation by a suitable handle or by a tool such as a screwdriver or wrench. Rotation of gear 156 causes rotation of bevel gear 162 carried on cross shaft 163 which is rotatably supported by plate 151 and which has intermediate limit cam element 164 disposed in recess 165 of plate 151, the ratio of gears 156 and 162 being 2:1. Cam 164 is shown also in FIG. 4A. One side of cam 164 is shaped as shown, a hemicylindrical portion 164a surrounding shaft 163 and recesses 164b and 164c being disposed at opposite sides of portion 164a. A pin 164d is disposed through plate 151 at opposite sides of recess 165 and extends across the recess. On rotation of shaft 163, cam 164 is rotated between positions wherein pin 164d is in one or the other of recesses 164b and 164c. The cam limits rotation of shaft 163 to about 186°, or slightly more than 180°. This limits member 167 to rotations of the same magnitude. Member 167, which provides a cam action, is affixed to shaft 163 at the end thereof opposite bevel gear 162. Element 167 is in the form of a cylindrical disc which is mounted on shaft 163 at its center and which has eccentric tapped connection opening 168 into which a screw 169 is received. Screw 169 is disposed through cylindrical opening 170 of fitting 172.

Fitting 172 has a tapped opening 173 at its lower end. Screw 175 has its upper end screwed into tapped opening 173, secured by locknut 176. Screw 175 is slidably disposed through a passage 178 of a fitting 179. A helical compression spring 180 is disposed about screw 175, its upper end being engaged against nut 181 which is locked in place by locknut 182. The lower end of spring 180 engages a shoulder 172a within fitting 179 around screw 175, biasing screw 175 upwardly with respect to fitting 179. Screw 185 pivotally connects fitting 179 to arm or bar 141 which, as mentioned before, is secured to plate 142 by screws 143. Therefore, when shaft 154 is rotated to rotate gears 156, 162, shaft 163 is rotated to rotate disc element 167 to raise or lower fitting 172, which in turn raises or lowers bar 141 and plate 142. The connection of bar 141 to fitting 179 at screw 185 is pivotal to permit rocking movement of fittings 172, 179. Upward movement of plate 142 moves plate 121 upwardly, the wheels 127, 128 thereby being moved away from track 70 or 70a. Opposite rotation of shaft 154 causes opposite movements of the connecting elements to lower plate 142 and plate 121 toward track 70 or 70a, thereby engaging the wheels 127, 128 with the track.

Support 151 has, at its lower lefthand corner as seen in FIG. 4, a recess 273 from which leads a cylindrical bore opening 275 within which are disposed helical compression spring 276 and slide member 277. Member 277 is reduced at 278, its portion within spring 276, and its lower portion is slidably fitted within the lower portion of opening 275. The lower end 279 is rounded and adapted to engage the upper surface of plate 121. The bearing of element 277, downwardly biased by helical compression spring 276, serves as a resilient deterrent to vibrational movements of plate 121, thereby stabilizing wheels 127, 128 against such vibrations and improving the smoothness of travel of the apparatus along track 70 or 70a. Plate member 151 is affixed to plate 17 by screws 281, 282, the heads of which are disposed in counterbores 283, 284, respectively.

Helical compression springs 180 and 276 serve to lock pivotal plate 121 in both its downward position, with wheels 127, 128 engaged with the track, and its upward position, with wheels 127, 128 raised above the track. When disc 167 is rotated to move plate 121 to its downward position, cam 164 is engaged with pin 164d at recess 164b, as shown in FIG. 4A. Helical compression spring 180, being firmly compressed, and the screw 169 being past dead center in its downward position by about 3° as positioned by the cam, disc 167 is locked in place in this position to hold plate 121 down with wheels 127, 128 forceably engaged against the track. When disc 167 is rotated to move plate 121 to its upward position, cam 164 is engaged with pin 164d at recess 164c. Helical compression spring 276, being firmly compressed by the upward movement of plate 121, and the screw 169 being past dead center in its upward position by about 3° as positioned by the cam, disc 167 is locked in place in this position to hold plate 121 up.

Referring now especially to FIGS. 7-9 of the drawings, and also to the righthand portion of FIG. 1 wherein the apparatus of FIGS. 7-9 is shown in outline form, a support 190 of L-shaped cross section as best seen in FIG. 7 is affixed to the upper surface of plate 19, as shown, with the recessed side 191 thereof facing toward the back side of the apparatus, which is the right side of the apparatus as it is shown in FIG. 7. A pair of parallel shafts 192, 193 are fixed to openings 200 through upper and lower flange portions 195, 196, respectively, of support element 190. Screw 194, journaled for rotation through flange portions 195, 196, has a knob 197 affixed to its upper end for use in rotation of screw 194. When rotated, the screw does not move longitudinally. The screw is engaged by threads through a threaded passage 194a through a plate 201, which is moved upwardly by rotation of screw 194 in one direction and is moved downwardly by rotation of the screw in the opposite direction. Shafts 192, 193 are slidably disposed through cylindrical passages through plate 201 and provide a way to guide plate 201 when it is moved by rotation of screw 194. A cross plate 204 (FIG. 8) is fixed to one end of plate 201 to be moved upwardly or downwardly therewith. Plate 204 has plate 206 affixed thereto by screws 207 and has plate 208 affixed thereto by screws 209. Plates 204 and 208 are relieved at slot 210.

Shafts 214, 215 are fixed to one side of a support body 216 by screws 216a, 216b. Shafts 214, 215 are slidably disposed through openings 217, 218 through plate 208 and through openings 220, 221 through plate 206. Bar 222 has openings at its upper and lower ends through which shafts 214, 215 are respectively disposed, the bar 222 being fixed in position on the shafts by set screws 224. Screw 225 is threadedly engaged through bar 222, and is journaled for rotation in openings through plate 206 and plate 208. Screw 225 does not move longitudinally when rotated. Screw 225 has a knob 227 fixed to its end to the right of plate 206 (FIG. 7) by which screw 225 may be rotated. When screw 225 is rotated, bar 222 is moved therealong by the threaded engagement, moving shafts 214, 215 longitudinally. When shafts 214, 215 are moved in opposite directions, support body 216 is moved toward or away from plate 208.

Support body 216 has at its front side an arcuate slot or recess 218 along which a slide element 219 having arcuate opposite sides is slidably disposed. Plate 322 is affixed to slide 219 by screws 223. A screw 225 extends through holes through yoke 226, plate 322 and slide 219, through an arcuate slot 228 through support 216, and through a helical compression spring 230, as shown best in FIG. 7. Spring 230 resiliently biases together the elements through which screw 225 passes, being sufficiently strong that equipment carried by yoke 226 is adequately supported, yet permitting slide 219 to be moved along slot 218 in the manner to be described. Bar 227 is affixed to yoke 226, its lower end being disposed in slot 227a of yoke 226. Yoke 226 and bar 227 may be rotated to a limited extent about screw 225. Knob 237 is fixed to one end of screw 229 with bar 227 between knob 237 and plate 322, and knob 234 is screwed onto the other end of screw 229. Referring also to FIGS. 12-12A, plate 322 narrows to become of the same width as bar 227 above shoulders 322a. Screw 229 is slidably disposed through cylindrical opening 322b of plate 322, and through cylindrical opening 227b through bar 227. Opening 227b has a conical seat 227c around its outer end against which the conical reverse side of knob 237 seats. A slot 227d of the full diameter of the opening is provided at one side of opening 227b. When knob 234 is loosened on screw 229, knob 237 may be pulled away from conical seat 227c to enable bar 227 to be pivotally rotated from its position in FIG. 12 to its angular position in FIG. 12A, slot 227d permitting the bar to be moved from screw 229. Yoke 226, affixed to bar 227, is similarly rotated with the bar, to move the welding or other apparatus 245 to an angular position. Cleaning of the welding electrode 247 may be easily accomplished when the welding apparatus is in the angular position. The bar 227 may then be returned to its normal position aligned with the upper part of plate 322 as shown in FIG. 12. Re-tightening of knob 234 on screw 229 draws the reverse side of knob 234 against conical seat 227c, locking bar 227 against movement until knob 234 is again loosened on screw 229. The conical seating of knob 237 at seat 227c exactly positions bar 227 with respect to plate 322, so that no misalignment of apparatus 245 results from this operation.

Slide 219 is moved in slot 218 by force exerted through knob 234 and plate 322 sufficient to overcome the friction between slide 219 and slot 218.

A pair of spring biased elements 231, 232 are resiliently biased by compression springs 233, 234 to hold slide element 219 firmly against the lower side of slot 218. Slide element 219 is held stabilized in whichever position it is disposed in slot 218 by these biasing spring assemblies as well as by the friction resulting from spring 230. The slide 219, however, may be moved along slot 218 by force exerted against handle 234 carried by plate 322.

Retainer 239, arcuately shaped, engages the opposite arms of yoke 226 and is affixed thereto by oppositely disposed screws 240 disposed through projecting portions 241 at opposite sides of retainer 239, there being a screw 240 at each side of the yoke-retainer assembly. A welding gun or head 245 is held clamped in yoke 226 by retainer 239. The welding electrode 247 is positioned in the welding groove formed between bevels 75a, 76a. The radial position of welding electrode 247 is adjusted by rotation of the screw 194 by its knob or handle 197 to raise or lower plates 201, 204 and shafts 214, 215 carried thereby, which support the support 216 to which the welding apparatus 245 is connected as described. The angularity of the welding tool or gun 245 and electrode 247 may be adjusted both before and during welding by movement of slide element 219 along slot 218. If desired, a servo motor (not shown) may be carried by support 216 or other suitable support so that the angular adjustments may be made by remote operation of the servo motor.

Arcuate slot 218 is designed and disposed in a special manner to accomplish a result which has not heretofore been realized. The arcuate curvature of slot 218 is made such that its center is disposed at the tip 247a of welding electrode 247. Therefore, when the angular position of the welding gun 245 is altered by exertion of force against arm 322 to move slide 219 along slot 218, the tip 247a of electrode 247 remains at the same location, or at least very closely thereto. Therefore, when the carriage apparatus is at different positions about a track 70 disposed about a pipe abutted with a second pipe to be welded thereto, the angularity of welding gun 245 may be adjusted in order to avoid running of the weld material or for other similar reasons without necessity for additional adjustments of the welding gun support apparatus. Therefore, the welding gun may be employed at one angularity for a certain arcuate portion of the weld and at another angularity for another arcuate portion of the weld without multiple adjustments, so that improved welds may be accomplished completely about the weld about the pipes in a very simple manner. This not only enables maximizing of weld quality at all points of the circumference of the weld, but additionally saves welding time and increases economy of the welding job.

Referring to FIG. 2 of the drawings, plate 255 is affixed by screws 256 to the side of plate 17 corresponding to the side of plate 19 at which the welding gun 245 is disposed. Hub 258 has threaded stud 259 which is screwed into tapped opening 261 through plate 255. Washer 262 is disposed between plate 255 and the hub 258. Reel connector 265 is connected to spindle 266 forming a part of hub 258. Connector 265 has generally semicircular part 265a which is engaged with generally semicircular part 265b by two screws 269 which are tightened against helical compression springs 270 disposed in cylindrical recesses 271. Only one of the screws 269 is shown, the other being behind the one shoen at the opposite side of the spindle. Pin 272 is disposed in a hole through connector part 265a, and extends therefrom.

A wire reel 274 has a central opening to receive spindle 266, the protruding end of pin 272 being placed in an opening 275 of reel 274 to locate the reel rotationally and to prevent rotation of the reel with respect to connector 265. A screw 277 is inserted and tightened to secure the reel to connector 265.

Reel 274, at its outer side, has a bearing ring 279 imbedded therein. Retainer 280 has a threaded opening 281 which is screwed onto the reduced threaded end 266a of spindle 266. A bearing ring 282 is imbedded in the inner side of retainer 280 to slidably engage bearing ring 279.

Reel 274 carries a supply of welding wire wound thereon, the wire being withdrawn and used at welding gun 245 as needed, reel 274 being rotated as the wire is withdrawn. The spring-loaded connection of reel connector 265 around spindle provides a frictional brake to control rotation of the reel, and thereby to control the tension of the wire passing from the reel to the welding gun. The compression of springs 270 is adjusted by adjusting screws 269, the restraint against rotation of reel 274 and the wire tension being adjusted in this manner.

The housing 285 shown in FIGS. 2, 5, 8 and 9 is removably connected to plate 18, providing an enclosed space therewithin. Controls for the apparatus, not shown, are disposed on plate 18 and protected by housing 285. The controls may include electrical equipment for controlling the direction of travel and speed of the carriage, by control of reversible electric motor 134 which drives wheels 127, 128. Other electrical equipment, such as a power cable, a control cable, transformers, and the like, may be housed within housing 285. The electrical cables are not shown, nor is the power cable for operation of motor 134, but this will be readily provided by those skilled in the art.

Figure 10:
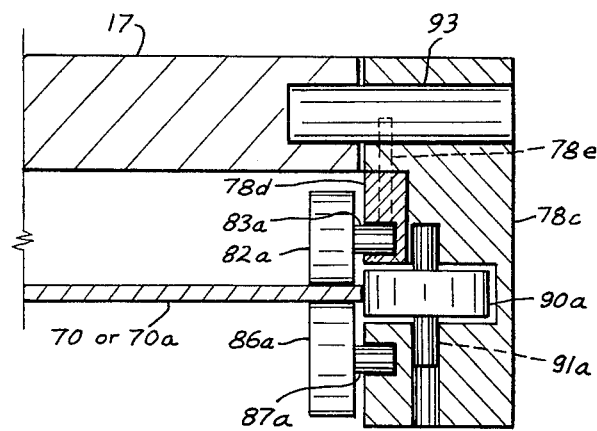
FIG. 10 is a vertical cross section showing a portion of the apparatus, taken at line 10—10 of FIG. 2.
Figure 11:
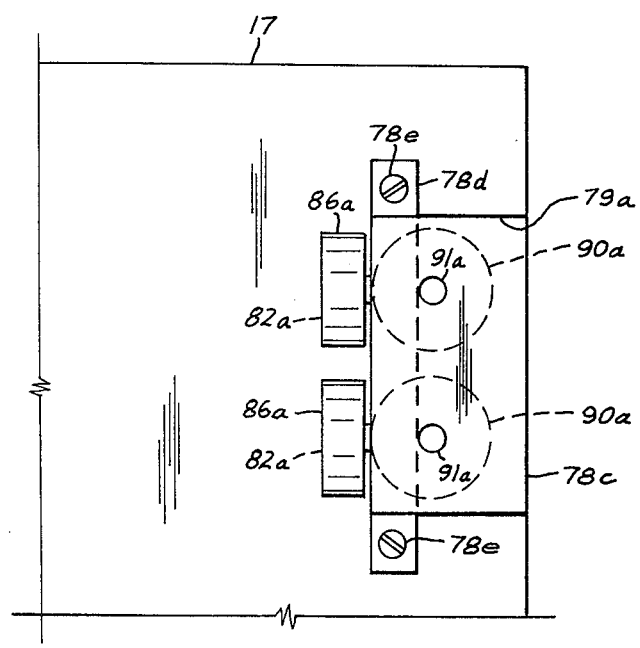
FIG. 11 is a bottom view of the apparatus portion shown in FIG. 10.

Assemblies 77a may have modified forms as shown in FIGS. 10-11. Referring to these drawings, each element 78a may be replaced by elements 78c and 78d. Element 78d is entirely separate from element 78c, being the portion of an element 78a which supports the upper wheels 82a and shafts 83a. Element 78d is elongated to extend past the recess 79a at both ends, and the ends of element 78d which overlap plate 17 or 19 are screwed thereto by screws 78e.

The advantage of the embodiment of assemblies 77a shown in FIGS. 10-11 over the form shown in FIG. 4 is that, when element 78c is moved outwardly in the manner already described for asemblies 77a, the wheels 82a are not moved, but remain in place to support the carriage even though the other wheels are disengaged from the track. Installation of the carriage on the track and removal of the carriage from the track are thereby facilitated.

The apparatus afforded by the invention is of very superior performance. The carriage may be employed on tracks of different curvatures or having no curvature, as has hereinbefore been made clear. The hinged carriage structure permits use of the apparatus on tracks of small radial curvature as well as on tracks of larger radial curvatures, and on straight tracks. The support wheels of the assemblies 77 together with the presence of the drive wheels 127,128 lock the carriage apparatus to the track in a stable manner, yet permit free movement of the carriage apparatus along the track. The apparatus is driven along the track by wheels 127, 128 in uniform uninterrupted motion. The support for the welding apparatus, or any other apparatus for performing work of generally similarly nature, firmly supports the work apparatus yet permits it to be universally adjusted in order to perform in a most satisfactory manner. The overall apparatus represents a step forward in the art, and is superior in utility and performance with regard to other apparatuses which have been known in the art.

While a preferred embodiment of apparatus according to the invention has been described and shown in the drawings, many modifications thereof may be made by a person skilled in the art without departing from the spirit of the invention, and it is intended to protect by Letters Patent all forms of the invention falling within the scope of the following claims.

We claim:

1. Welding carriage apparatus adapted for travel along a track, comprising a three part carriage body assembly having a first body part having a hinged connection to one end of a second body part and having a third body part having a hinged connection to the other end of said second body part, said first and third body parts each having wheel means for engaging said track and said second body part being supported between said first and third body parts and having no engagement with said track, a welding tool mounted on said third body part and adapted to form welds longitudinally of said track, means for rigidly yet adjustably fixing said first and second body parts and said second and third body parts against pivotal movements therebetween at said respective hinged connections whereby said third body part is fixed against movement with respect to the position of said first body part, said means for rigidly yet adjustably fixing said first and second body parts and said second and third body parts against pivotal movements also permitting adjustments of said wheel means of said first and third body parts for travel along tracks of different curvatures, said engagements of said wheel means of said first and second body parts with said track permitting relative movements between said first and second body parts and said track, said wheel means of said first body part including at least one pair of wheels spaced longitudinally of one side of said track, said first body part supporting drive wheel means movable forceably against the other side of said track between said longitudinally spaced wheels whereby when said drive wheel means is forceably engaged with said track said first body part is fixed against pivotal movement with respect to said track whereby said third body part is also fixed against movements with respect to said track so that movement of said welding tool mounted on said third body part tending to diminish weld quality is prevented.

2. The combination of claim 1, each said wheel means engaging opposite sides of said track whereby said first and second body means are retained against movement away from said track, each said wheel means being releasable from said track whereby said carriage body assembly may be removed from said track.

3. The combination of claim 2, said track comprising an elongate flat strip of uniform width, said strip being longitudinally bendable and being adapted to be fixed about an object and uniformly spaced therefrom whereby said object may be welded to an adjacent object by said welding tool during travel of said carriage body assembly about said track.

4. The combination of claim 3, said welding tool being mounted on said third body part by support means carried by said third body part supporting said welding tool spaced from one side of said track, said support means being adjustable to adjust the spacing of said welding tool from said one side of said track and to adjust the angle of said welding tool with respect to said track in a plane through the weld perpendicular to said track.

5. The combination of claim 4, each of said first, second, and third body parts being of generally flat plate form.

6. The combination of claim 5, said drive wheel means being driven in rotation by an electric drive motor carried by said first body part and connected to said drive wheel means in driving relation therewith.

7. Welding carriage apparatus, comprising three carriage body parts connected together end to end by hinges, a welding tool supported by one end body part, drive wheel means supported by the other end body part, each of said end body parts having opposite sets of plural wheels, each said set of plural wheels of said one end body part including wheels for engaging the upper and lower faces of a strip track near an edge of said track and including a wheel for engaging an edge of said track, each said set of plural wheels of said other end body part including a pair of wheels spaced longitudinally of said track for engaging said lower face of said track near an edge of said track and including a wheel for engaging said upper face of said track near an edge of said track and including a wheel for engaging an edge of said track, said drive wheel means being carried by said other end body part midway between said opposite sets of plural wheels thereof and midway between the wheels of each said longitudinally spaced pair of wheels and being movable between a position forceably engaged against said upper face of said track and a position loosened with respect to said upper face of said track, said drive wheel means when in said position forceably engaged against said upper face of said track causing clamping of said track firmly between said drive wheel means at said upper face of said track and said wheels of said longitudinally spaced pairs of wheels at said lower face of said track whereby said other end body part is firmly fixed against rotation with respect to said track, means for adjustably fixing the angles between said body parts at said hinges whereby the relative positions of said one and other end body parts are rigidly fixed, whereby when said other end body part is firmly fixed against rotation with respect to said track said one end body part is also firmly fixed in position whereby said welding tool does not move transversely of said track during welding and weld quality is thereby improved.

8. The combination of claim 7, one said set of plural wheels of each of said end body parts being retractable away from said track to enable installation of said apparatus on said track and removal of said apparatus from said track.

9. The combination of claim 8, including means supporting said welding tool on said one body part permitting transverse adjustable movement of said welding tool toward and away from one edge of said track and permitting angular movement of said welding tool about its tip in the direction of a plane perpendicular to said upper and lower faces of said track.

* * * * *